(12) United States Patent
Suba et al.

(10) Patent No.: US 7,870,307 B2
(45) Date of Patent: Jan. 11, 2011

(54) DMA AND GRAPHICS INTERFACE EMULATION

(75) Inventors: Victor O Suba, Foster City, CA (US); Stewart R Sargaison, Foster City, CA (US); Brian M. C. Watson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 871 days.

(21) Appl. No.: 11/740,652

(22) Filed: Apr. 26, 2007

(65) Prior Publication Data
US 2007/0260446 A1    Nov. 8, 2007

Related U.S. Application Data

(60) Provisional application No. 60/797,435, filed on May 3, 2006, provisional application No. 60/797,762, filed on May 3, 2006, provisional application No. 60/797,761, filed on May 3, 2006, provisional application No. 60/746,267, filed on May 3, 2006, provisional application No. 60/746,268, filed on May 3, 2006, provisional application No. 60/746,273, filed on May 3, 2006, provisional application No. 60/763,568, filed on Jan. 30, 2006.

(51) Int. Cl.
*G06F 13/28* (2006.01)
*G06F 9/455* (2006.01)
*G06F 9/45* (2006.01)
(52) U.S. Cl. .................. 710/22; 703/26; 717/136
(58) Field of Classification Search .......... 710/22; 703/26; 717/136
See application file for complete search history.

(56) References Cited

U.S. PATENT DOCUMENTS

| 5,088,033 A | 2/1992 | Binkley et al. |
| 5,784,595 A * | 7/1998 | Devins et al. .............. 703/24 |
| 6,205,414 B1 | 3/2001 | Forsman et al. |

(Continued)

FOREIGN PATENT DOCUMENTS

WO    WO 9921081 A1 *  4/1999

OTHER PUBLICATIONS

International Search Report mailed on Mar. 5, 2008, for PCT Application No. PCT/US07/68153 filed May 3, 2007, 2 pages.

*Primary Examiner*—Alford W Kindred
*Assistant Examiner*—Farley J Abad
(74) *Attorney, Agent, or Firm*—Townsend and Townsend and Crew, LLP

(57) ABSTRACT

An emulator schedules emulation threads for DMA emulation and other emulation functions in a time-multiplexed manner. Emulation threads are selected for execution according to a load balancing scheme. Non-DMA emulation threads are executed until their execution time period expires or they stall. DMA emulation thread execution is allowed to execute indefinitely until the DMA emulation thread stalls. The DMA emulation thread prefetches additional adjacent data in response to target computer system DMA requests. Upon receiving a target computer system DMA request, the DMA emulation thread first checks to the prefetched data to see if this data matches the request. If so, the request is fulfilled using the prefetched data. If the prefetched data does not match the target computer system DMA request, the DMA emulation thread fetches and stores the requested data and additional adjacent data for potential future use.

20 Claims, 6 Drawing Sheets

U.S. PATENT DOCUMENTS

| | | |
|---|---|---|
| 6,675,289 B1 | 1/2004 | Eslick et al. |
| 6,763,328 B1 | 7/2004 | Egolf et al. |
| 6,931,641 B1 * | 8/2005 | Davis et al. ................. 718/108 |
| 7,512,751 B2 * | 3/2009 | Ellis et al. ................... 711/154 |
| 2002/0072893 A1 | 6/2002 | Wilson |
| 2004/0054517 A1 * | 3/2004 | Altman et al. ................ 703/27 |

* cited by examiner

DMA AND GRAPHICS INTERFACE EMULATION

CROSS-REFERENCE TO RELATED APPLICATIONS

This application claims priority to U.S. Provisional Patent Application No. 60/797,435, filed May 3, 2006, entitled "DMA and Graphics Interface Emulation," which is related to U.S. Provisional Patent Application No. 60/763,568, filed Jan. 30, 2006, entitled "Branch Prediction Thread Management," U.S. Provisional Patent Application No. 60/797,762, filed May 3, 2006, entitled "Stall Prediction Thread Management," U.S. Provisional Patent Application No. 60/797,761, filed May 3, 2006, entitled "Code Translation and Pipeline Optimization," U.S. Provisional Patent Application No. 60/746,267, filed May 3, 2006, entitled "Translation Block Invalidation Prehints in Emulation of a Target System on a Host System;" U.S. Provisional Application No. 60/746,268, filed May 3, 2006, entitled "Register Mapping in Emulation of a Target System on a Host System;" and U.S. Provisional Patent Application No. 60/746,273, filed May 3, 2006, entitled "Method and Apparatus for Resolving Clock Management Issue in Emulation Involving Both Interpreted and Translated Code," all of which are hereby incorporated herein by reference for all purposes.

BACKGROUND OF THE INVENTION

The invention is related to emulation software to execute applications on a computer or information processing device other than the one for which the applications were originally written. Applications are typically developed to be executed by computer systems of a particular type or that meet specific specifications. Developers specify the functions of an application as source code expressed in one or more programming languages. Source code is typically designed to be easily written and understood by human developers. Development applications, such as compilers, assemblers, linkers, and interpreters, convert an application expressed as source code into binary code or object code modules, which are in a format capable of being executed by the intended system. The binary code or object code format typically is adapted to the architecture of the intended computer system, including the number and type of microprocessors; the arrangement of memory and storage; and the audio, video, networking, and other input and output subsystems. The computer system originally intended to execute an application is referred to as a target computer system.

Often, it is desirable to be able to execute applications on different types of computer systems other than the one for which the applications were originally written. For example, users with a new computer system, such as a video game console, may still wish to use applications previously purchased for other types of computer systems, such as older video game consoles. A computer system that is of a different type than the target computer system originally intended for an application is referred to as a host computer system.

One solution for executing applications on host computer systems, i.e. types of computer systems other than the one for which the applications were originally written, is to modify the application. Application source code can be modified, or ported, to a different type of computer system. However, this is difficult, time-consuming, and expensive if there are substantial differences between the target computer system and the host computer system.

Emulation is another solution for executing applications on host computer systems. Emulation software and/or hardware enables the host computer system to mimic the functionality of the target computer system. A target system using the appropriate emulation will ideally respond to an application's binary code in the same or similar way as the target computer system.

One of the simplest types of emulation is a software interpreter that sequentially analyzes each instruction in an application's binary code modules, creates one or more equivalent instructions for the host computer system, and then executes the equivalent instructions. The emulator also typically includes data structures adapted to represent the state of the emulated target computer system. The emulator also may include software functions or modules adapted to mimic the hardware functions of the emulated target computer system and to interface hardware resources of the host computer system with the application.

Because of the overhead associated with constantly analyzing and converting application instructions into equivalent host computer system instructions, software interpreters often require orders of magnitude more processing performance on a host computer system to execute an application at the same speed as the target computer system. Thus, for applications requiring real-time emulation, software interpreters are often too slow to be used when the host computer system is not substantially faster than the target computer system.

A more complicated type of emulation employs binary translation to convert large portions of an application's binary code modules into corresponding portions of host computer system instructions prior to execution. Binary translation can be performed statically, i.e. prior to the execution of the application by the host computer system, or dynamically, i.e. during the execution of other portions of the application by the host computer system. Translated portions, or blocks, of the application can be cached, thereby amortizing the performance penalty associated with emulation for frequently executed portions of the application, such as loops, functions, and subroutines. Translated blocks of the application can also be optimized for execution by host computer system, taking advantage of application information known in advance or determined while running portions of the application.

It thus is desirable for emulators to provide improved performance when executing applications on a target system. It is further desirable for emulators to optimize translated code to take advantage of unique hardware features of the host computer system while ensuring correct emulation behavior.

BRIEF SUMMARY OF THE INVENTION

Embodiments in accordance with the present invention schedule emulation threads for DMA emulation and other emulation functions to be executed in a time-multiplexed manner. Emulation threads in one embodiment are selected for execution according to a load balancing scheme. For non-DMA emulation threads, the emulation thread is executed until its execution time period expires or the thread stalls. For DMA emulation threads, the DMA emulation thread execution is allowed to execute indefinitely until the DMA emulation thread stalls. In a further embodiment, the DMA emulation thread prefetches additional adjacent data in response to target computer system DMA requests. Upon receiving a target computer system DMA request, the DMA emulation thread first checks to the prefetched data to see if this data matches the request. If so, the request is fulfilled using the prefetched data. If the prefetched data does not match the target computer system DMA request, the DMA emulation thread fetches and stores the requested data and additional adjacent data for potential future use.

A further understanding of the nature and the advantages of the inventions disclosed herein may be realized by reference of the remaining portions of the specification and the attached drawings.

BRIEF DESCRIPTION OF THE DRAWINGS

The invention will be described with reference to the drawings, in which.

DETAILED DESCRIPTION OF THE INVENTION

Figure 1:
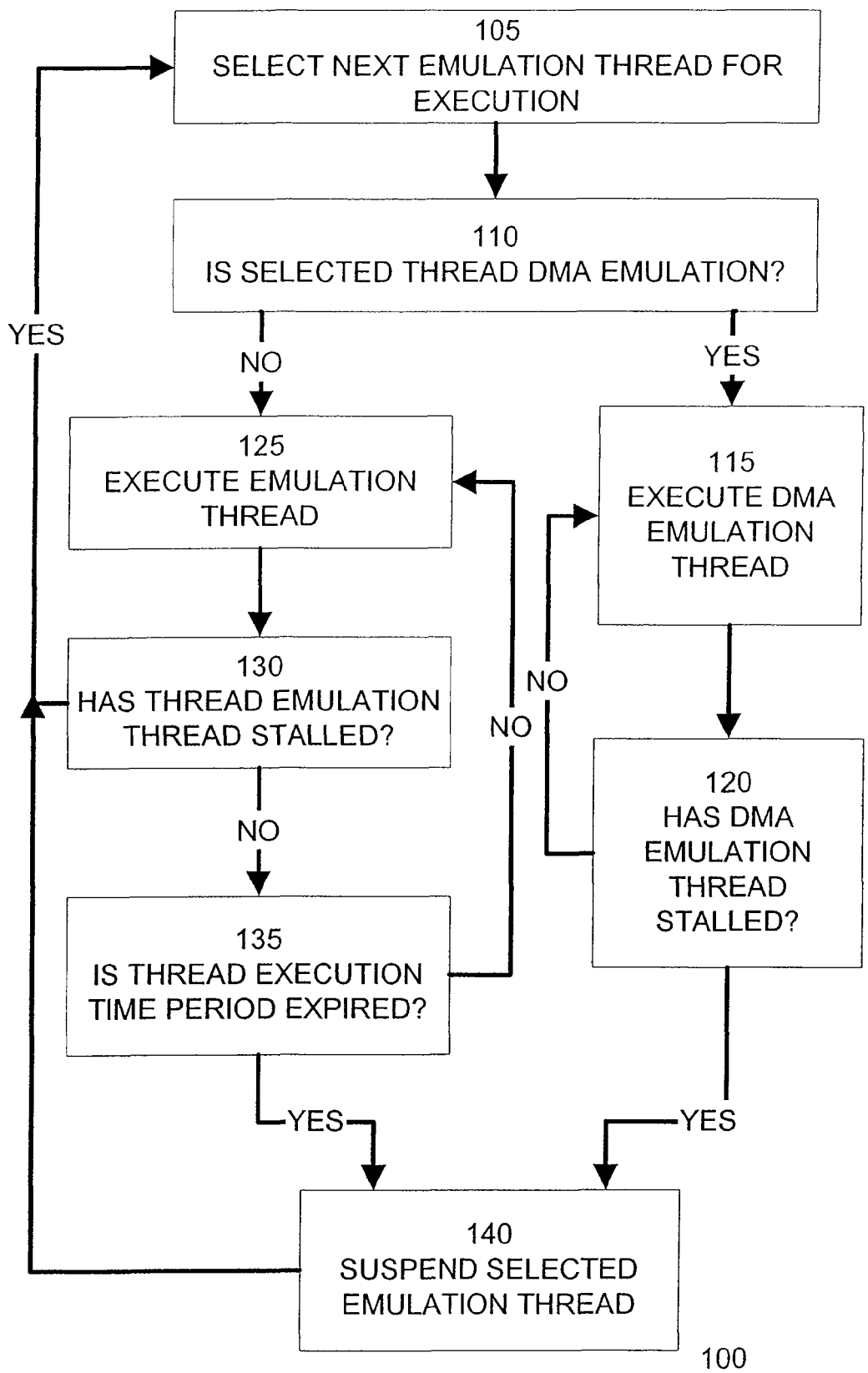
FIG. 1 illustrates a method of scheduling threads of a multithreaded emulator according to an embodiment of the invention.

Threads of execution, or threads, are commonly used for splitting programs into two or more simultaneous running tasks. Multiple threads can often be executed in parallel, such as by multiple microprocessors operating in parallel; a single microprocessor with multiple execution cores or specialized multithreaded execution capabilities; or by time-multiplexing different threads, where a processor frequently switches execution between different threads.

In the latter case, an application, such as an emulator or operating system, can schedule thread execution to maximum performance of all threads. Typically, an application allocates to each time-multiplexed thread an execution time period. The execution time period can be expressed in terms of time, processor clock cycles, number of instructions, or any other measurement of processor computing resources. The processor executes each thread during its assigned execution time period. After the expiration of its execution time period, the processor suspends execution of the current thread until the thread is assigned a new execution time period. The processor then executes another thread for its assigned execution time period. The number and size of the execution time periods assigned to each thread determine the proportion of the processor's computing resources devoted to each thread.

Emulators can use multiple threads of execution to emulate the functions of different portions of the target computer system that operate in parallel. Because many portions of the target computer system are often dependent on instruction and data interactions with other portions of the target computer system, the emulator should schedule for execution emulator threads corresponding to these portions of the target computer system in accordance with these dependencies.

For example, direct memory access (DMA) is commonly used by target computer systems to transfer data and instructions between its different portions with minimal processor supervision. If the DMA transfers to a component of the target computer system do not arrive fast enough, the component may stall while waiting for necessary instructions and/or data. Conversely, if the DMA attempts to transfer data to a component of the target computer system too quickly, the registers, local buffers, or local storage of the component will be overwhelmed and unable to accept all of the DMA transfer. As a result, the DMA transfer will stall, which may potentially block subsequent DMA transfers to other components of the target computer system. This may cause the other components of the target computer system to stall while waiting for their DMA transfers to arrive. Applications for target computer systems are often finely tuned to prevent either of these conditions from occurring. For emulators executing applications on a target system, it is important for the emulated DMA system to maintain an optimal DMA transfer rate to all of the emulated components and to utilize host computer system resources in an efficient manner.

FIG. 1 illustrates a method 100 of scheduling threads of a multithreaded emulator according to one embodiment. Method 100 can be used to schedule threads of an emulator for execution on a single processor or processor core in a time multiplexed manner and for execution on multiple processors or processor cores in parallel. Method 100 can be applied to threads used to emulate DMA functionality of a target computer system on a target system. Method 100 can also be applied to threads emulating the functionality of components of a target computer system highly dependent upon DMA transfers.

Method 100 begins with step 105, which selects the next thread for execution. In an embodiment, step 105 can select emulator threads for execution according to any load-balancing scheme known in the art. For example, step 105 can select threads for execution randomly, in a round-robin manner, or according to a priority scheme. Step 105 also assigns the selected thread an execution time period.

Step 110 determines if the emulation thread selected for execution is a DMA emulation thread associated with DMA emulation. If not, method 100 proceeds to step 125. Step 125 executes the selected Emulation thread.

While the selected emulation thread is being executed, step 130 monitors the selected emulation thread to determine if this thread has stalled. For example, the selected emulation thread may stall if it is waiting on a resource of the host computer system, such as information from another thread or the host computer system's DMA functions. The selected emulation thread may also stall if the local storage, buffer, or other memory that data is being transferred to is full.

If the selected emulation thread has stalled, the selected emulation thread is suspended to avoid wasting processor time. Then, method 100 proceeds from step 130 back to step 105 to select the next emulation thread for execution.

If the selected emulation thread is executing normally, step 135 determines whether the thread execution time period of the selected emulation thread has expired. If not, the selected emulation thread is allowed to continue to operate. If the DMA emulation thread's execution time period has expired, then method 100 proceeds from step 135 to step 140. Step 140 suspends the selected emulation thread. Following the suspension of the selected emulation thread, method 100 proceeds from step 140 back to step 105 to select the next emulation thread for execution. In an alternate embodiment, interrupts are used to control the execution time period of emulation threads, rather than assigning execution time periods to emulation threads in advance.

Conversely, if step 110 determines that the emulation thread selected for execution is a DMA emulation thread associated with the emulation of the target computer system's DMA functionality on the host computer system, then method 100 proceeds to step 115. Step 115 executes the DMA emulation thread. While the DMA emulation thread is being executed, step 120 determines whether the DMA emulation thread has stalled. The DMA emulation thread may stall if there are no more DMA commands to be processed, if there are no more DMA channels available for use by the DMA emulation thread, or if the local storage, buffer, or other memory that data is being transferred to is full. If not, the selected emulation thread is allowed to continue to operate.

If the DMA emulation thread has stalled, or the thread's execution time period has expired, the DMA emulation thread is suspended in step 140 and method 100 returns to step 105 to select another emulation thread for execution.

In some emulators, the DMA emulation thread, which emulates the DMA functionality of the target computer system, may utilize the DMA functionality of the host computer system. In these types of emulators, the DMA emulation thread essentially translates DMA operations in an application intended for the target computer system into equivalent DMA operations on the host computer system. However, there may be differences in the latency and bandwidth between DMA functions on the target computer system and the host computer system. Therefore, it is often desirable for the DMA emulation thread to optimize its DMA operations to the characteristics of the host computer system.

Figure 2:
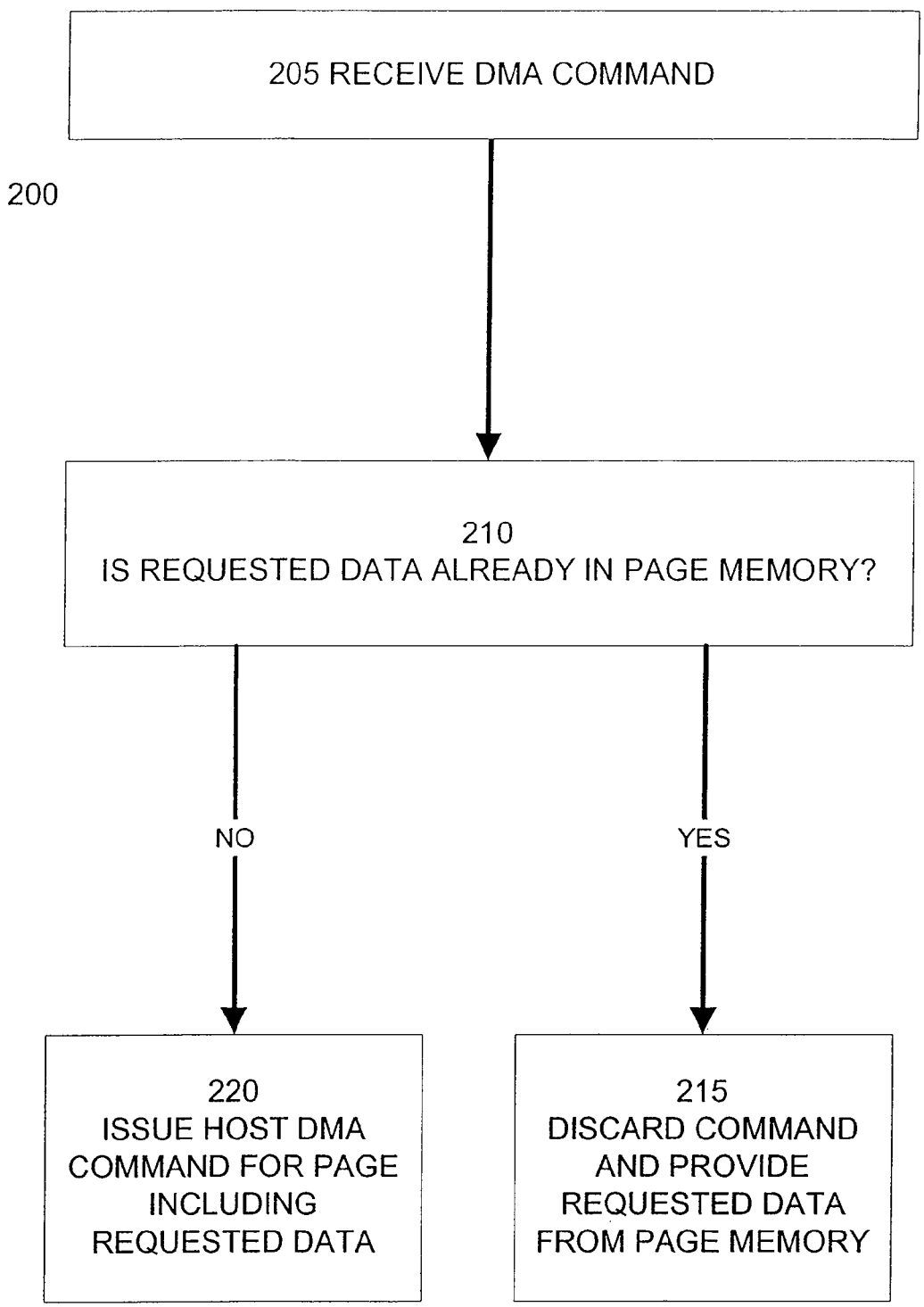
FIG. 2 illustrates a method of optimizing direct memory access emulation according to an embodiment of the invention.

FIG. 2 illustrates a method 200 of optimizing direct memory access emulation according to one embodiment. In step 205 a target computer system DMA command is received. DMA commands can be received from other emulation threads responsible for the emulation of target computer system components that issue DMA commands, such as threads responsible for processor and I/O emulation.

The target computer DMA command is analyzed in step 210 to identify the data requested. The requested data can be identified by one or a range of memory addresses in the target computer system address space. In an alternate embodiment, the requested data can be identified by one or a range of memory addresses in the host computer system address space.

In an embodiment, emulator prefetches DMA data by rounding the size of DMA requests up to a larger value to fetch additional adjacent data. For example, if a target computer system DMA command requests a set of 64 bytes of data, the emulator may issue a host computer DMA command for a page of 512 bytes of data. The page of data requested will include the set of 64 bytes of data originally specified by the target computer system DMA command, as well as additional adjacent data before and/or after this set. This page of data is saved in local storage, along with associated identifying information, for potential future use. Embodiments of the emulator may save multiple pages of data for potential future use.

After identifying the data requested by the target computer system DMA command, step 210 determines if this requested data is part of a page of data previously retrieved and stored. In an embodiment, step 210 compares the memory address or range of addresses of the requested data with the range of memory addresses associated with one or more pages of previously stored data.

If the requested data is located within the range of memory addresses associated with a page of previously stored data, step 215 discards the target computer system DMA command and retrieves the requested data from the appropriate page of memory. This data is then provided to the appropriate portion of the emulator in accordance with the target computer system DMA request.

Conversely, if the requested data is not located within the range of memory addresses associated with any page of previously stored data, step 220 converts the target computer system DMA request into a corresponding host computer system DMA request. In an embodiment, step 220 performs address translation from the target computer system address space to the host computer system address space if needed. Additionally, the corresponding host computer system DMA request rounds the size of the data requested to a full page of data that includes the originally requested data.

Figure 3:
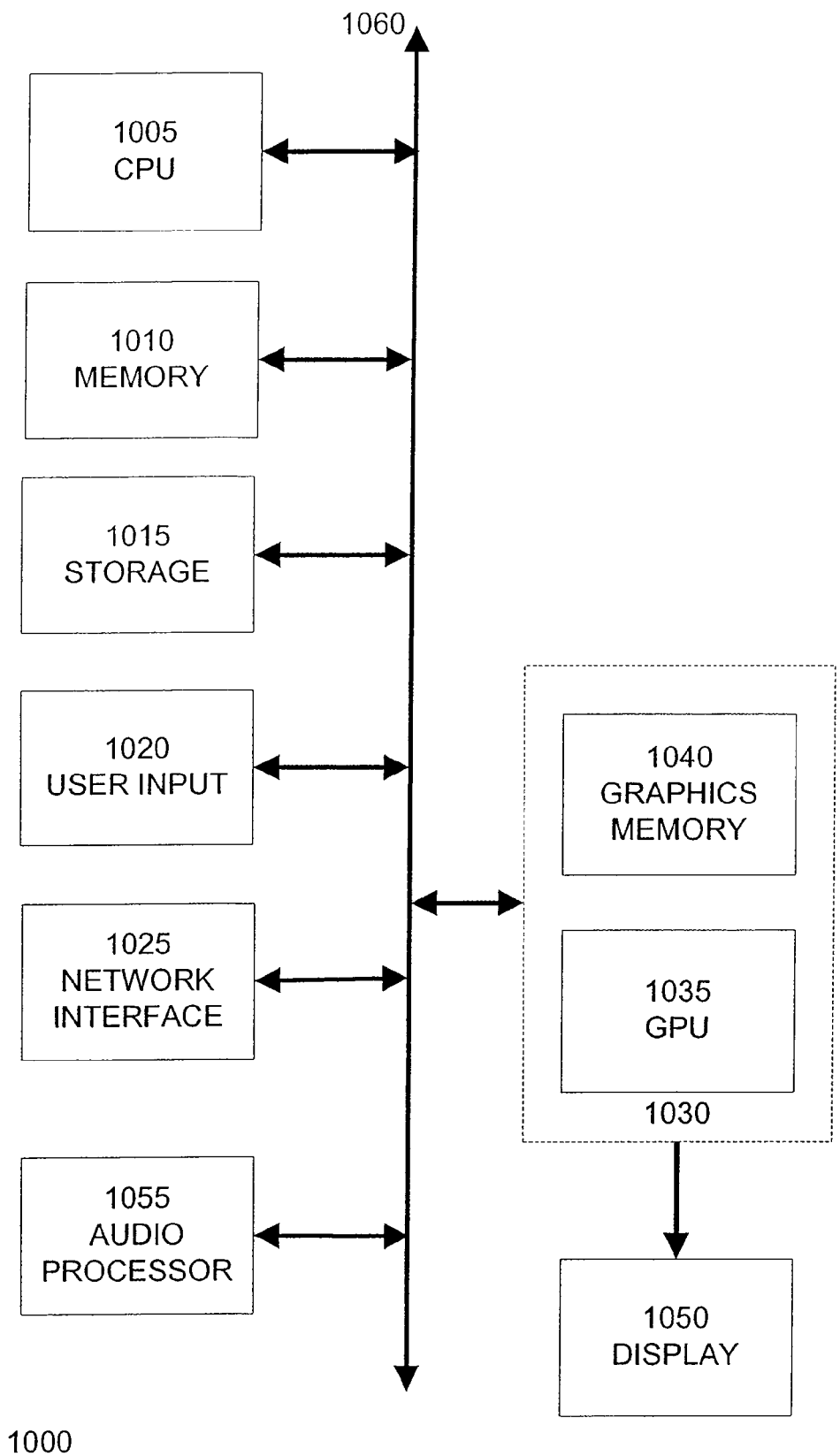
FIG. 3 illustrates an example hardware system suitable for implementing an embodiment of the invention.

FIG. 3 illustrates an example hardware system suitable for implementing an embodiment of the invention. FIG. 3 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 5:
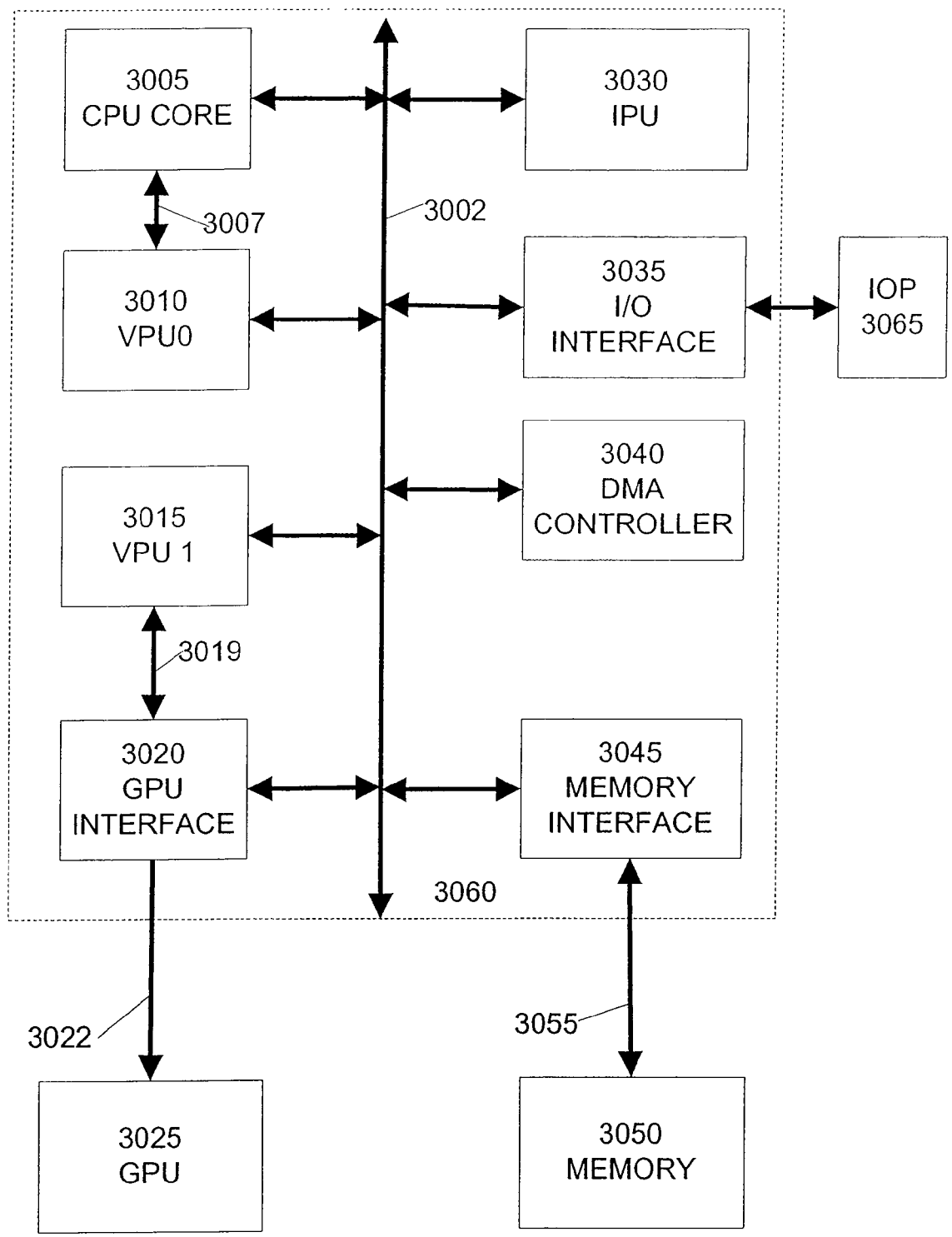
FIG. 5 illustrates an example target computer system capable of being emulated using embodiments of the invention.

In certain embodiments, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 5 illustrates an example processor 2000 suitable for implementing an embodiment of the invention.

Figure 4:
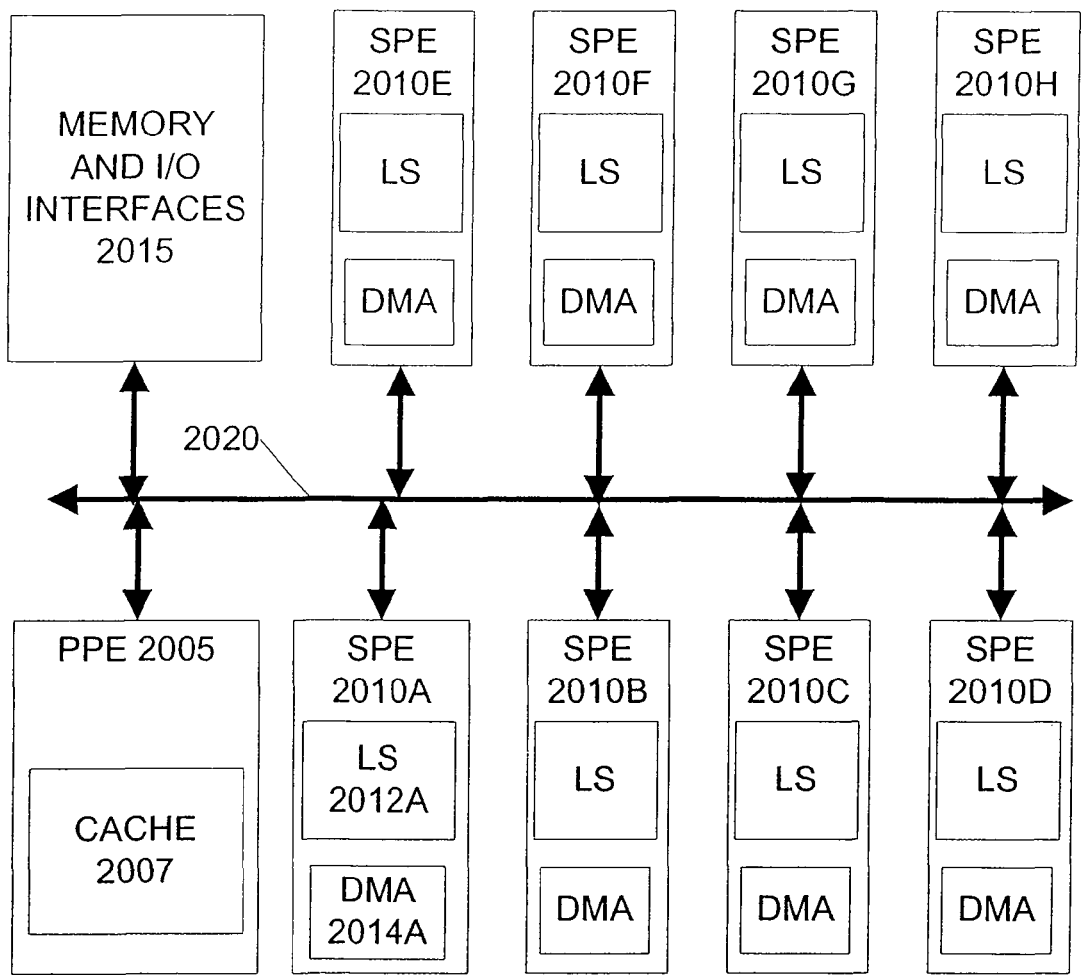
FIG. 4 illustrates an example processor suitable for implementing an embodiment of the invention.

FIG. 4 illustrates an exemplary hardware system suitable for implementing an embodiment in accordance with the present invention. FIG. 5 is a block diagram of a computer system 1000, such as a personal computer, video game console, personal digital assistant, or other digital device, suitable for practicing such an embodiment. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 5 illustrates an example processor 2000 suitable for implementing an embodiment of the invention.

Processor 2000 includes a number of processor elements, each capable of executing independent programs in parallel. Processor 2000 includes PPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

Embodiments of the invention can be used to improve emulator performance and compatibility for a variety of different types of target computer systems, including general computer system 1000 shown above. FIG. 5 illustrates another example target computer system 3000 capable of being emulated using embodiments of the invention.

Target computer system 3000 illustrates the hardware architecture of the Sony Playstation 2 video game console. Target computer system 3000 includes a variety of components connected via a central data bus 3002. These components include a CPU core 3005; a pair of vector processing units, VP0 3010 and VP1 3015; a graphics processing unit interface 3020; an image processing unit 3030; an I/O interface 3035; a DMA controller 3040; and a memory interface 3045. In addition to the central data bus 3002, target computer system 3000 includes a private bus 3007 between CPU core 3005 and vector processing unit VP0 3010 and a private bus 3019 between vector processing unit VPU1 3015 and graphics processing unit interface 3020.

In some applications, components 3005, 3010, 3015, 3020, 3030, 3035, 3040 and 3045 are included within a processor chip 3060. Processor chip 3060 is connected with graphics processing unit 3025 via graphics bus 3022 and with memory 3050 via memory bus 3055. Additional external components, such as sound and audio processing components, network interfaces, and optical storage components, are omitted from FIG. 6 for clarity.

Figure 6:
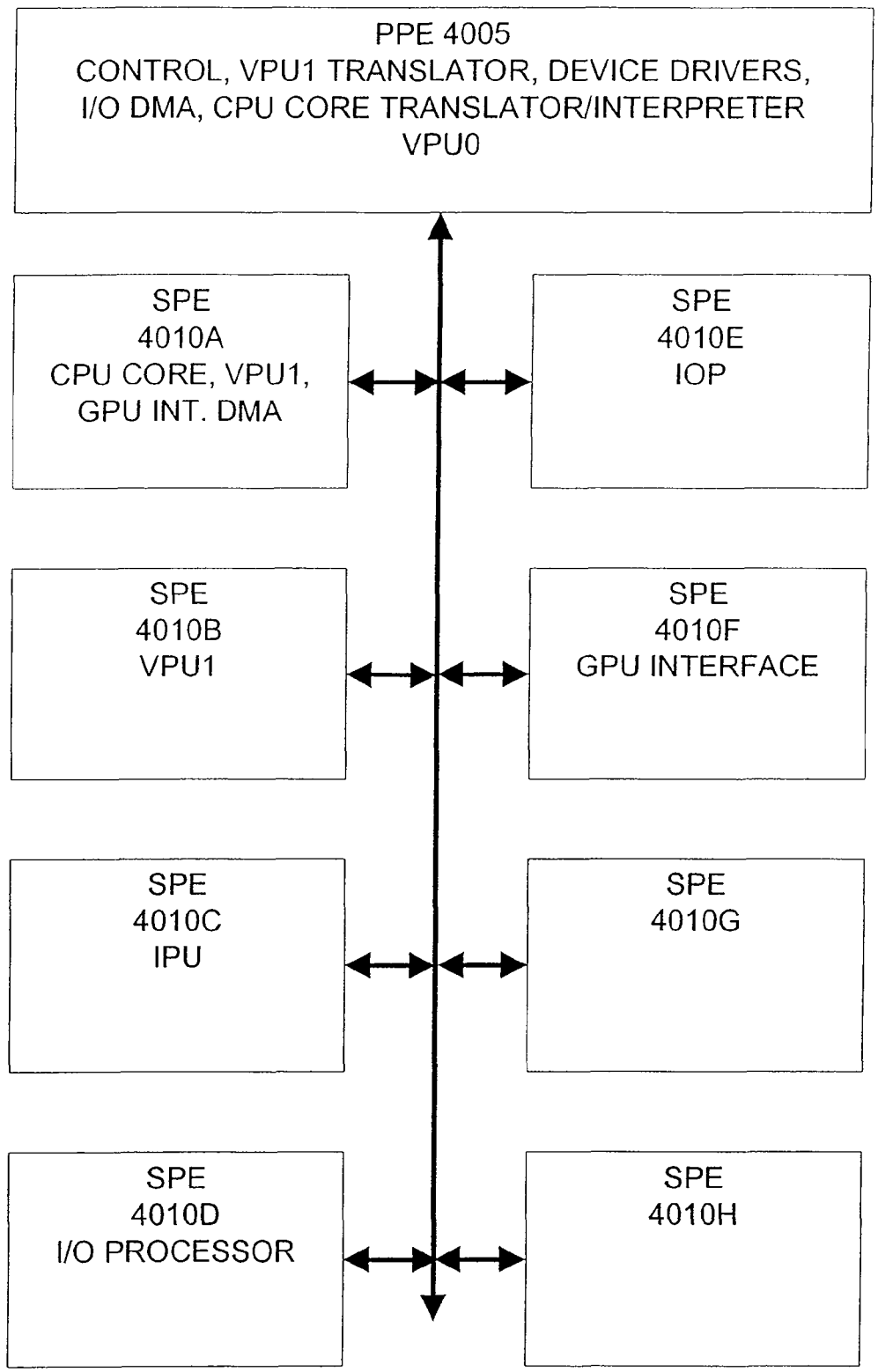
FIG. 6 illustrates an example emulator architecture on a host computer system capable of emulating the target computer system of FIG. 5.

FIG. 6 illustrates an example emulator architecture 4000 on a host computer system capable of emulating the target computer system 3000 of FIG. 6. In this example, emulator architecture 4000 is implemented on a host computer system including a processor similar to processor 2000 of FIG. 5.

In emulator architecture 4000, PPE processor element 4005 executes one or more emulator threads that provide functions including emulator control; device drivers; a vector processing unit VPU1 code translator; CPU core emulation including code interpreters and translators; and vector processing unit VPU0 emulation.

SPE processor element 4010E executes one or more emulation threads that provide functions including DMA controller emulation; vector processing unit VPU1 interface emulation; and graphics processing unit interface arbitration.

SPE processor element 4010F executes one or more emulation threads that execute the translated or recompiled vector processing unit VPU1 code. SPE processor element 4010G executes one or more emulation threads that emulate the image processing unit. SPE processor element 4010H executes one or more emulation threads that emulate the I/O interface functions. SPE processor element 4010A executes one or more emulation threads that emulate the functions of sound and audio processors. SPE processor element 4010B executes one or more emulation threads that emulate the functions of the graphics processing unit interface.

In some implementations, additional emulation threads executed by PPE processor element 4005 and/or SPE processor elements can emulate the functionality of the graphics processing unit of the target computer system or translate graphics processing instructions to a format compatible with the graphics processing unit of the host computer system (omitted for clarity from FIG. 7). In other implementations, the host computer system can include a graphics processing unit similar to or compatible with the graphics processing unit of the target computer system.

The above example source and host computer systems are discussed for the purposes of illustration and embodiments of the invention can improve performance and compatibility of emulation of any type of target computer system by any type of host computer system. Further embodiments can be envisioned to one of ordinary skill in the art from the specification and figures. In other embodiments, combinations or subcombinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of executing a multithreaded emulator, the method comprising:
   selecting an emulation thread from a plurality of emulation threads for execution, where the emulation thread is executed on a host system to emulate the operations of a target system and the selection of the emulation thread is based off a load balancing scheme,
   executing the selected emulation thread on the host system;
   determining whether the executing emulation thread is a direct memory access emulation thread;
   in response to a determination that the executing emulation thread is a direct memory access emulation thread and that it has stalled, suspending the executing emulation thread and selecting another emulation thread from the plurality of execution threads for execution based off the load balancing scheme; and
   otherwise, in response to a determination that the executing emulation thread is not a direct memory access emulation thread and that an execution time period associated with the executing emulation thread has expired or that the executing emulation thread has stalled, selecting another emulation thread from the plurality of execution threads for execution based off the load balancing scheme.

2. The method of claim 1, wherein the selected emulation thread is associated with a DMA emulation, and wherein executing the selected emulation thread comprises:
   receiving a target system DMA command specifying a physical memory target address in the emulated target system of first requested data;
   determining if the physical memory target address in the emulated target system of the first requested data corresponds with data stored in a page memory of the host system;
   in response to the determination that the first requested data corresponds with data stored in the page memory of the host system, retrieving the first requested data from the page memory of the host system;
   in response to the determination that the first requested data does not correspond to data stored in the page memory of the host system:
      translating the target system DMA command into a host system DMA command, wherein the host system DMA command specifies a physical memory target address of the first requested data and a physical memory target address of additional requested data in the host system; and
      executing the host system DMA command to retrieve the first requested data and the additional requested data from the host system and to store the first requested data and the additional requested data in the page memory of the host system.

3. The method of claim 2, wherein the response to the determination that the first requested data does not correspond with data stored in page memory of the host system further comprises:
   storing information identifying the first requested data and the additional requested data as stored in page memory of the host system to facilitate the determination that a second requested data of a second target system DMA command can be found in page memory of the host system where the first requested data and the additional requested data are stored.

4. The method of claim 3, wherein the information identifying the first requested data and the additional requested data is derived from the physical memory target addresses in the emulated target system of the first requested data and the additional requested data.

5. The method of claim 2, wherein the target system DMA command specifies the location in target system address space and wherein translating comprises:
   translating the location in target system address space to a location in host system address space.

6. The method of claim 2, wherein the physical memory target address in the emulated target system of the additional requested data is adjacent to the physical memory target address in the emulated target system of the first requested data.

7. The method of claim 6, wherein the physical memory target address in the emulated target system of at least a portion of the additional requested data is before the physical memory target address in the emulated target system of the first requested data.

8. The method of claim 6, wherein the physical memory target address in the emulated target system of at least a portion of the additional requested data is after the physical memory target address in the emulated target system of the first requested data.

9. The method of claim 1, wherein the load balancing scheme is a round-robin balancing scheme.

10. The method of claim 1, wherein the expiration of the execution time period is indicated by an interrupt.

11. A method of emulating a DMA system of a target system using a host system, the method comprising:
   receiving a target system DMA command specifying a physical memory target address in the emulated target system of first requested data;
   determining if the physical memory target address in the emulated target system of the first requested data corresponds with data stored in a page memory of the host system;
   in response to a determination that the first requested data corresponds with data stored in the page memory of the host system, retrieving the first requested data from the page memory of the host system;
   in response to a determination that the first requested data does not correspond to data stored in the page memory of the host system:
      translating the target system DMA command into a host system DMA command, wherein the host system DMA command specifies a physical memory target address of the first requested data and a physical memory target address of additional requested data in the host system; and
         executing the host system DMA command to retrieve the first requested data and the additional requested data from the host system and to store the first requested data and the additional requested data in the page memory of the host system.

12. The method of claim 11, wherein the response to the determination that the first requested data does not correspond with data stored in page memory of the host system further comprises:
   storing information identifying the first requested data and the additional requested data as stored in page memory of the host system to facilitate the determination that a second requested data of a second target system DMA command can be found in page memory of the host system where the first requested data and the additional requested data are stored.

13. The method of claim 12, wherein the information identifying the first requested data and the additional requested data is derived from the physical memory target addresses in the emulated target system of the first requested data and the additional requested data.

14. The method of claim 11, wherein the target system DMA command specifies the location in target system address space and wherein translating comprises:
   translating the location in target system address space to a location in host system address space.

15. The method of claim 11, wherein the physical memory target address in the emulated target system of the additional requested data is adjacent to the physical memory target address in the emulated target system of the first requested data.

16. The method of claim 15, wherein the physical memory target address in the emulated target system of at least a portion of the additional requested data is before the physical memory target address in the emulated target system of the first requested data.

17. The method of claim 15, wherein the physical memory target address in the emulated target system of at least a portion of the additional requested data is after the physical memory target address in the emulated target system of the first requested data.

18. A computer program product embedded in a non-transitory computer readable medium for executing a multi-threaded emulator, comprising:
   program code for selecting an emulation thread from a plurality of emulation threads for execution, where the emulation thread is executed on a host system to emulate the operations of a target system and the selection of the emulation thread is based off a load balancing scheme,
   program code for executing the selected emulation thread on the host system;
   program code for determining whether the executing emulation thread is a direct memory access emulation thread;
   program code for suspending the executing emulation thread and selecting another emulation thread from the plurality of execution threads for execution based off the load balancing scheme in response to a determination that the executing emulation thread is a direct memory access emulation thread and that it has stalled; and
   program code for selecting another emulation thread from the plurality of execution threads for execution based off the load balancing scheme in response to a determination that an execution time period associated with the emulation thread has expired or that the executing emulation thread has stalled and that the emulation thread is not a direct memory access emulation thread.

19. The computer program product of claim 18, wherein the load balancing scheme is a round-robin load balancing scheme.

20. The computer program product of claim 18, further comprising program code for indicating the expiration of the execution time period by an interrupt.

* * * * *